(12) United States Patent
Bransi et al.

(10) Patent No.: US 8,687,653 B2
(45) Date of Patent: Apr. 1, 2014

(54) TUNNEL PATH MTU DISCOVERY

(75) Inventors: Charles Bransi, San Jose, CA (US);
Adoor Balasubramanian, Cupertino, CA (US); Li Meng, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 681 days.

(21) Appl. No.: 12/610,173

(22) Filed: Oct. 30, 2009

(65) Prior Publication Data
US 2011/0103399 A1 May 5, 2011

(51) Int. Cl.
*H04J 3/16* (2006.01)
*H04L 12/56* (2011.01)
*H04L 1/00* (2006.01)

(52) U.S. Cl.
CPC ............. *H04L 47/36* (2013.01); *H04L 1/0007* (2013.01)
USPC ...................................................... 370/470

(58) Field of Classification Search
CPC .................... H04L 2012/2013; H04L 1/0007; H04L 47/36
USPC ......... 370/351, 352, 355, 356, 464, 465, 470, 370/474; 709/227
See application file for complete search history.

(56) References Cited

U.S. PATENT DOCUMENTS

| | | | |
|---|---|---|---|
| 7,684,440 B1 * | 3/2010 | Maufer et al. ................ | 370/476 |
| 2003/0076850 A1 * | 4/2003 | Jason, Jr. ....................... | 370/414 |
| 2007/0171828 A1 * | 7/2007 | Dalal et al. .................... | 370/235 |
| 2007/0183425 A1 * | 8/2007 | Lim et al. ....................... | 370/392 |
| 2007/0286069 A1 * | 12/2007 | Xu ................................. | 370/218 |
| 2009/0232003 A1 * | 9/2009 | Vasseur et al. ............. | 370/236.2 |
| 2009/0285238 A1 * | 11/2009 | Shiraishi ....................... | 370/474 |
| 2010/0220649 A1 * | 9/2010 | Sakai ............................ | 370/328 |

OTHER PUBLICATIONS

F. Gont, TCP Maintenance and Minor Extensions (tcpm), "ICMP attacks against TCP," Jun. 4, 2009. pp. 1-75.
K. Lahey, Network Working Group Request for Comments (RFC) 2923, "TCP Problems with Path MTU Discovery," Sep. 2000, pp. 1-15.
P. Savola, Network Working Group Request for Comments (RFC) 4459, "MTU and Fragmentation Issues with In-theNetwork Tunneling," Apr. 2006, pp. 1-15.

* cited by examiner

*Primary Examiner* — Obaidul Huq
(74) *Attorney, Agent, or Firm* — Fountainhead Law Group, PC (57) ABSTRACT

A solution for tunnel path MTU discovery includes, at a first network device configured as an origination endpoint for a tunnel, storing a keep-alive packet having a size of an interface maximum transmission unit (MTU), the keep-alive packet indicating the packet should not be fragmented, the second network device configured as a termination endpoint for the tunnel. If the sending fails, the size of the keep-alive packet is iteratively changed to converge upon a path MTU, where the path MTU is the size of a largest keep-alive packet that can be sent from the first network device to the second network device without fragmentation.

32 Claims, 7 Drawing Sheets

TUNNEL PATH MTU DISCOVERY

FIELD OF THE INVENTION

The present invention relates to the field of computer science. More particularly, the present invention relates to tunnel path MTU discovery.

BACKGROUND OF THE INVENTION

Path MTU discovery (PMTUD) is a technique in computer networking for determining the maximum transmission unit (MTU) size on a network path between two Internet Protocol (IP) hosts, usually with the goal of avoiding IP packet fragmentation.

Path MTU discovery works by setting the DF (Don't Fragment) option bit in the IP headers of outgoing packets. Then, any device along the path whose MTU is smaller than the packet will drop the packet, and send back an Internet Control Message Protocol (ICMP) "Fragmentation Needed" message containing the device's MTU, allowing the source host to reduce its path MTU appropriately. The process repeats until the MTU is small enough to traverse the entire path without fragmentation.

If the path MTU changes after the connection is set up and is lower than the previously determined path MTU, the first large packet will cause an ICMP error and the new, lower path MTU will be found. Conversely, if PMTUD finds that the path allows a larger MTU than what is possible on the lower link, the operating system will periodically reprobe to determine whether the path has changed to allow larger packets.

ICMP messages may be spoofed, thereby reducing the MTU size of a tunnel. This is known as a "Path MTU Discovery attack." ICMP messages can also be used in denial of service attacks. Because of these security concerns, many network security devices, such as firewalls or access control lists (ACLs) on routers, block all ICMP messages.

Blocking ICMP messages in this way prevents PMTUD from working, as PMTUD relies upon ICMP to update the MTU value. All packets with the DF bit set that are larger than the MTU are then dropped. Troubleshooting this connectivity issue is problematic as only some packets are allowed through (those that do not require fragmentation, and those which do not have the DF bit set). This can result in connections that complete a transmission control protocol (TCP) three-way handshake correctly, but then hang when data is transferred. This state is referred to as a "black hole connection."

If the tunnel origination endpoint does not set the DF bit, it is possible that the tunnel termination endpoint will need to re-assemble the fragmented packets. This is a relatively inefficient alternative, as it carries a large performance penalty compared to the case where the originating tunnel endpoint fragments the packet.

RFC 4459 ("MTU and Fragmentation Issues with In-the-Network Tunneling") addresses packet fragmentation and re-assembly, but fails to address problems associated with using ICMP packets as a way to discover the path MTU. And an Internet draft entitled "ICMP attacks against TCP" (http://www.ietf.org/id/draft-ietf-tcpm-icmp-attacks-06.txt) addresses the security of TCP against ICMP attacks. However, none of the solutions are suitable for Tunnels. Accordingly, a need exists in the art for an improved solution for tunnel path MTU discovery.

SUMMARY OF THE INVENTION

A solution for tunnel path MTU discovery includes, at a first network device configured as an origination endpoint for a tunnel, storing a keep-alive packet having a size of an interface maximum transmission unit (MTU), the keep-alive packet indicating the packet should not be fragmented, the second network device configured as a termination endpoint for the tunnel. If the sending fails, the size of the keep-alive packet is iteratively changed to converge upon a path MTU, where the path MTU is the size of a largest keep-alive packet that can be sent from the first network device to the second network device without fragmentation.

BRIEF DESCRIPTION OF THE DRAWINGS

The accompanying drawings, which are incorporated into and constitute a part of this specification, illustrate one or more embodiments of the present invention and, together with the detailed description, serve to explain the principles and implementations of the invention.

In the drawings.

DETAILED DESCRIPTION

Embodiments of the present invention are described herein in the context of tunnel path MTU discovery. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

According to one embodiment of the present invention, the components, process steps, and/or data structures may be implemented using various types of operating systems (OS), computing platforms, firmware, computer programs, computer languages, and/or general-purpose machines. The method can be run as a programmed process running on processing circuitry. The processing circuitry can take the form of numerous combinations of processors and operating systems, connections and networks, data stores, or a stand-alone device. The process can be implemented as instructions executed by such hardware, hardware alone, or any combination thereof. The software may be stored on a program storage device readable by a machine.

According to one embodiment of the present invention, the components, processes and/or data structures may be implemented using machine language, assembler, C or C++, Java and/or other high level language programs running on a data processing computer such as a personal computer, workstation computer, mainframe computer, or high performance server running an OS such as Solaris® available from Sun Microsystems, Inc. of Santa Clara, Calif., Windows Vista™, Windows NT®, Windows XP, Windows XP PRO, and Windows® 2000, available from Microsoft Corporation of Redmond, Wash., Apple OS X-based systems, available from Apple Inc. of Cupertino, Calif., or various versions of the Unix operating system such as Linux available from a number of vendors. The method may also be implemented on a multiple-processor system, or in a computing environment including various peripherals such as input devices, output devices, displays, pointing devices, memories, storage devices, media interfaces for transferring data to and from the processor(s), and the like. In addition, such a computer system or computing environment may be networked locally, or over the Internet or other networks. Different implementations may be used and may include other types of operating systems, computing platforms, computer programs, firmware, computer languages and/or general-purpose machines; and. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein.

In the context of the present invention, the term "network" includes local area networks (LANs), wide area networks (WANs), metro area networks, residential networks, corporate networks, inter-networks, the Internet, the World Wide Web, cable television systems, telephone systems, wireless telecommunications systems, fiber optic networks, token ring networks, Ethernet networks, ATM networks, frame relay networks, satellite communications systems, and the like. Such networks are well known in the art and consequently are not further described here.

In the context of the present invention, the term "identifier" describes an ordered series of one or more numbers, characters, symbols, or the like. More generally, an "identifier" describes any entity that can be represented by one or more bits.

In the context of the present invention, the term "distributed" describes a digital information system dispersed over multiple computers and not centralized at a single location.

In the context of the present invention, the term "processor" describes a physical computer (either stand-alone or distributed) or a virtual machine (either stand-alone or distributed) that processes or transforms data. The processor may be implemented in hardware, software, firmware, or a combination thereof.

In the context of the present invention, the term "data store" describes a hardware and/or software means or apparatus, either local or distributed, for storing digital or analog information or data. The term "Data store" describes, by way of example, any such devices as random access memory (RAM), read-only memory (ROM), dynamic random access memory (DRAM), static dynamic random access memory (SDRAM), Flash memory, hard drives, disk drives, floppy drives, tape drives, CD drives, DVD drives, magnetic tape devices (audio, visual, analog, digital, or a combination thereof), optical storage devices, electrically erasable programmable read-only memory (EEPROM), solid state memory devices and Universal Serial Bus (USB) storage devices, and the like. The term "Data store" also describes, by way of example, databases, file systems, record systems, object oriented databases, relational databases, SQL databases, audit trails and logs, program memory, cache and buffers, and the like.

In the context of the present invention, the term "network interface" describes the means by which users access a network for the purposes of communicating across it or retrieving information from it.

In the context of the present invention, the term "system" describes any computer information and/or control device, devices or network of devices, of hardware and/or software, comprising processor means, data storage means, program means, and/or user interface means, which is adapted to communicate with the embodiments of the present invention, via one or more data networks or connections, and is adapted for use in conjunction with the embodiments of the present invention.

It should be noted that the tunnel path MTU discovery system is illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a computer-readable medium as above as modules in any manner, and can be used separately or in combination.

Example embodiments of the present invention provide a solution where a tunnel originating endpoint such as a router sends modified keep-alive packets, iteratively changing the size of the packets with the DF bit set to converge upon the tunnel path MTU. A successful packet transmission indicates there was no packet fragmentation. An unsuccessful transmission indicates there was packet fragmentation. The process increases the size of the packets while the previous keep-alive packet succeeded, and decreases the size of the packets while the previous keep-alive packet failed, to converge upon the largest keep-alive packet that can be sent successfully (without fragmentation).

A signaling mechanism from the tunnel termination endpoint to the tunnel origination endpoint may be used to provide an initial minimum path MTU, decreasing path MTU convergence time. The tunnel origination endpoint sends a relatively large keep-alive packet with the DF bit not set, indicating that the packet may be fragmented. The tunnel termination endpoint determines whether a keep-alive packet has been fragmented, and if it has been fragmented, the tunnel termination endpoint modifies a MTU field of the keep-alive packet to indicate the size of the first packet fragment, and sends the modified keep-alive packet back to the tunnel origination endpoint. The tunnel origination endpoint uses the value in the MTU field of the modified keep-alive packet as the initial minimum path MTU.

Discovery by the tunnel originating endpoint does not rely on ICMP, so it cannot be thwarted by ICMP spoofing or ICMP denial of service attacks. Additionally, the tunnel originating endpoint starts the tunnel path MTU discovery mechanism. Reassembly at the tunnel termination endpoint is obviated, providing improved efficiency compared to solutions where a tunnel termination endpoint must reassemble packets.

Figure 1:
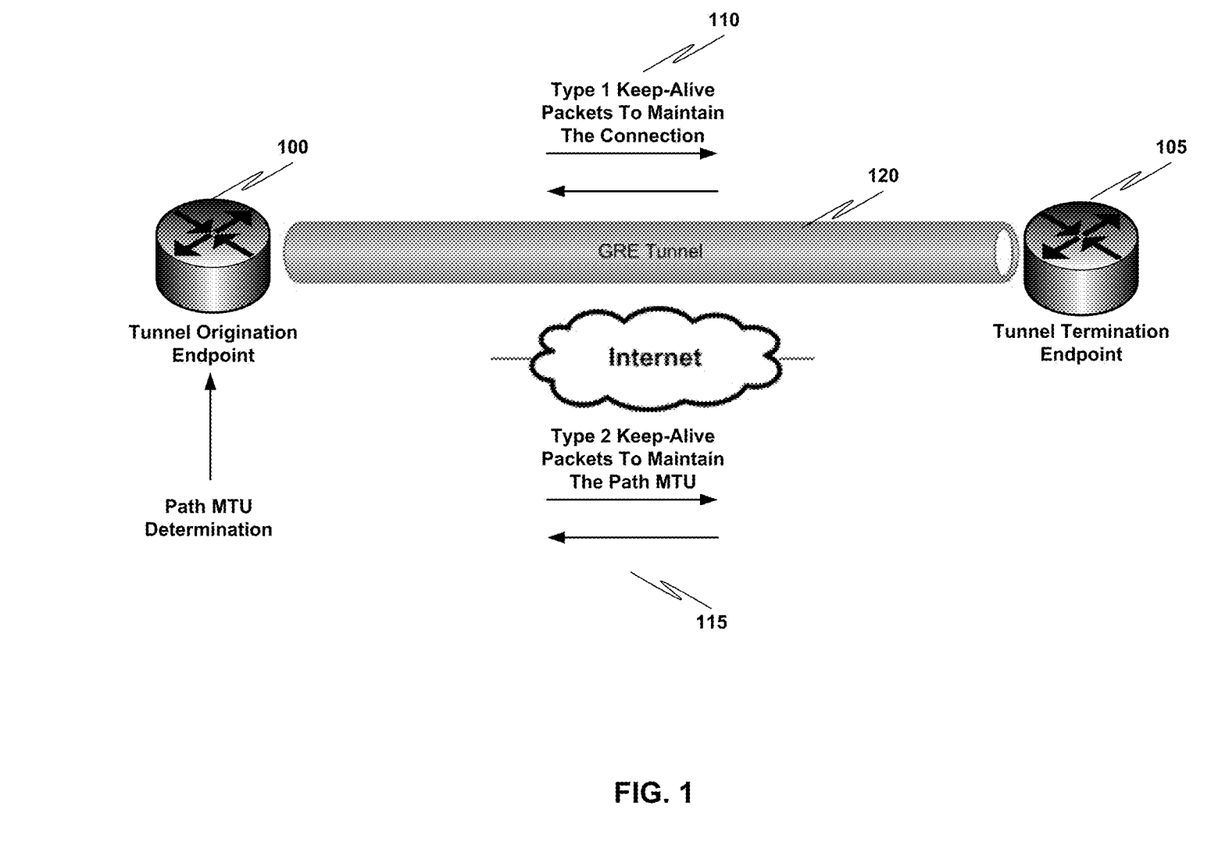
FIG. 1 is a block diagram that illustrates a system for tunnel path MTU discovery in accordance with one embodiment of the present invention.

FIG. 1 is a block diagram that illustrates a system for tunnel path MTU discovery in accordance with one embodiment of the present invention. As shown in FIG. 1, a network device configured as a tunnel origination endpoint 100 is further configured to use a first type of keep-alive packets 110 to maintain a connection with a network device configured as a tunnel termination endpoint 105. Network device 100 is further configured to use a second type of keep-alive packets 115 to determine a path MTU. Network device 100 determines the path MTU by iteratively changing the size of the second type of keep-alive 115 packets with the DF bit set (indicating the packets may not be fragmented) to converge upon a largest keep-alive packet that can be sent from the tunnel origination endpoint 100 to the tunnel termination endpoint 105 without fragmentation. A successful packet transmission indicates there was no packet fragmentation. An unsuccessful transmission indicates there was packet fragmentation. The process increases the size of the packets while the previous keep-alive packet succeeded, and decreases the size of the packets while the previous keep-alive packet failed, to converge upon the largest keep-alive packet that can be sent successfully (without fragmentation) from the tunnel origination endpoint 100 to the tunnel termination endpoint 105.

A signaling mechanism from the tunnel termination endpoint 105 to the tunnel origination endpoint 100 may be used to provide an initial minimum path MTU, decreasing path MTU convergence time. The tunnel origination endpoint 100 sends a relatively large keep-alive packet with the DF bit not set, indicating that the packet may be fragmented. The tunnel termination endpoint 105 determines whether a keep-alive packet has been fragmented, and if it has been fragmented, the tunnel termination endpoint 105 modifies a MTU field of the keep-alive packet to indicate the size of the first packet fragment, and sends the modified keep-alive packet back to the tunnel origination endpoint 100. The tunnel origination endpoint 100 uses the value in the MTU field of the modified keep-alive packet as the initial minimum path MTU.

According to one embodiment of the present invention, the second type of keep-alive packet is sent at a multiple of the period for sending the first type of keep-alive packets.

According to one embodiment of the present invention, tunnel origination endpoint 100 comprises a first router, and tunnel termination endpoint 105 comprises a second router. According to another embodiment of the present invention, tunnel 120 comprises a Generic Routing Encapsulation (GRE) tunnel.

Figure 2A:
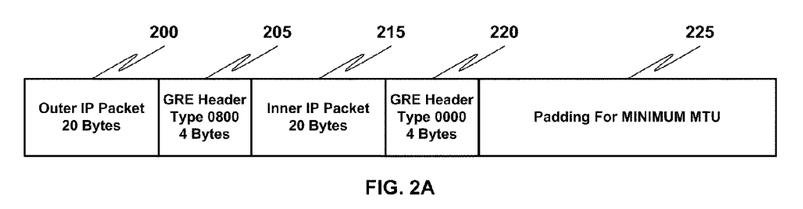
FIG. 2A is a block diagram that illustrates a packet format for a keep-alive packet for use in maintaining a connection.

FIG. 2A is a block diagram that illustrates a packet format for a keep-alive packet for use in maintaining a connection. The packet shown in FIG. 2A comprises an outer IP packet field 200, a GRE header type 0800 field 205, an inner IP packet field 215, a GRE header type 0000 field 220, and padding for a minimum MTU 225. The packet shown in FIG. 2A may be used to maintain a connection as discussed with respect to reference numeral 110 of FIG. 1.

Figure 2B:
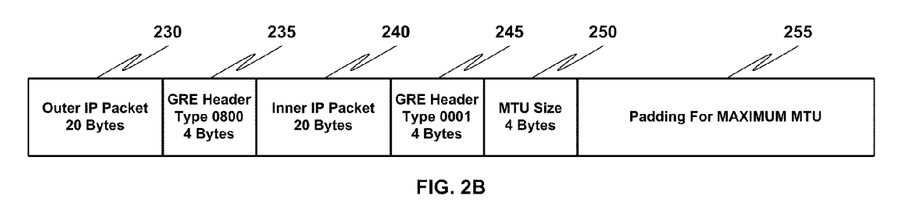
FIG. 2B is a block diagram that illustrates a packet format for a keep-alive packet for use in determining a tunnel path MTU in accordance with one embodiment of the present invention.

FIG. 2B is a block diagram that illustrates a packet format for a keep-alive packet for use in determining a tunnel path MTU in accordance with one embodiment of the present invention. The packet shown in FIG. 2B comprises an outer IP packet field 230, a GRE header type 0800 field 235, an inner IP packet field 240, a GRE header type 0001 field 245, an MTU size field 250, and padding for a maximum MTU 255. The packet shown in FIG. 2B may be used to maintain the path MTU as discussed with respect to reference numeral 115 of FIG. 1.

Figure 3:
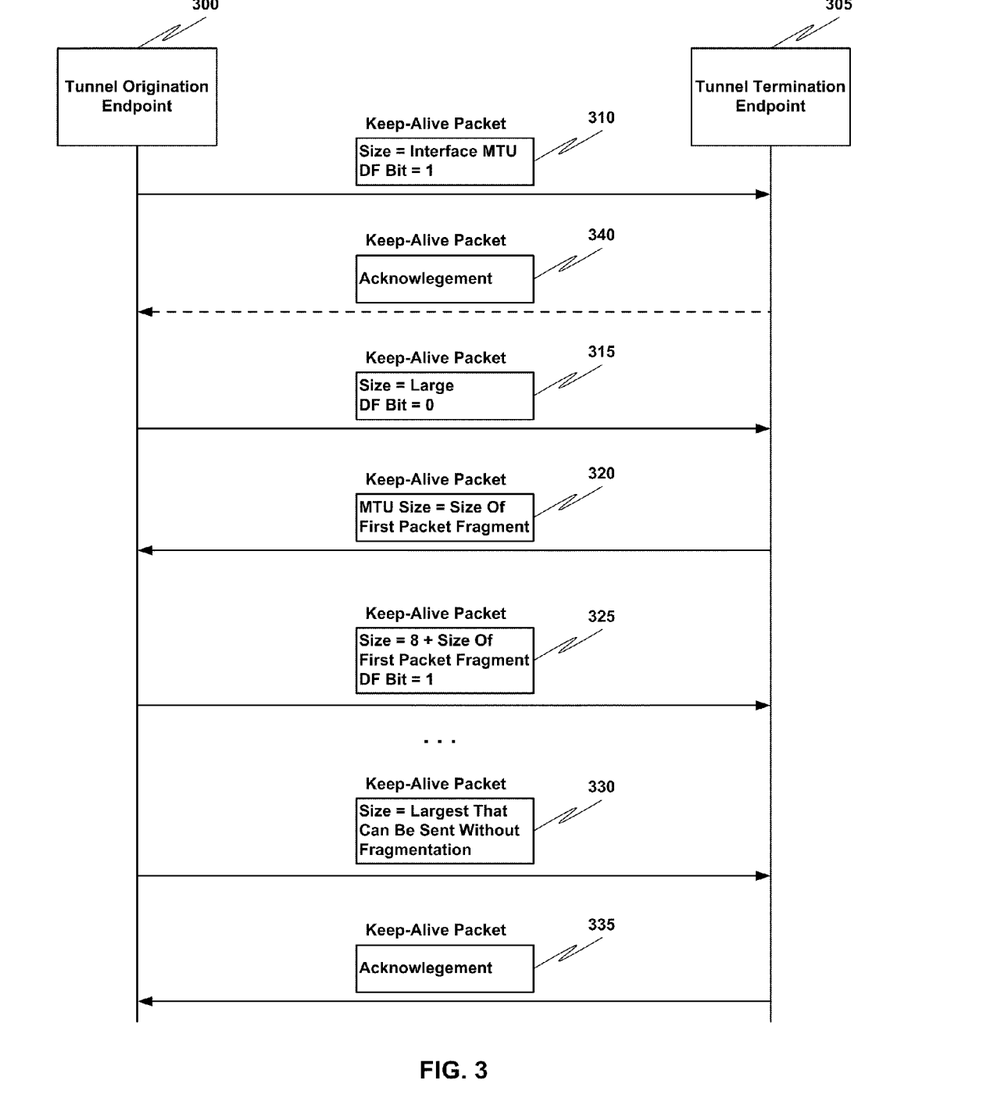
FIG. 3 is a ladder diagram that illustrates a method for tunnel path MTU discovery in accordance with one embodiment of the present invention.

FIG. 3 is a ladder diagram that illustrates a method for tunnel path MTU discovery in accordance with one embodiment of the present invention. As shown in FIG. 3, a tunnel origination endpoint 300 sends a keep-alive packet 310 having a size equal to the interface MTU and having the DF bit set. Success is indicated if an acknowledgement keep-alive packet 340 is returned to the tunnel origination endpoint 300. The keep-alive packet 310 is sent until the sending fails, as indicated by a predetermined number of retries being exceeded without the acknowledgement keep-alive packet 340 being returned to the tunnel origination endpoint 300. When the predetermined number of retries is exceeded, the tunnel origination endpoint 300 sends a keep-alive packet 315 having a relatively large size and with the DF bit not set. Tunnel termination endpoint 305 determines whether the received keep-alive packet 315 has been fragmented. If tunnel termination endpoint 305 determines that the received keep-alive packet 315 has been fragmented, tunnel termination endpoint 305 updates an MTU field in the header of the keep-alive packet 315 to indicate the size of the first fragment of the fragmented packet, and sends the updated keep-alive packet 320 to tunnel origination endpoint 300. Tunnel origination endpoint 300 initiates search of the path MTU by iteratively changing the size of a keep-alive packet having the DF bit set, to converge on a keep-alive packet 330 having a size equal to the largest keep-alive packet that can be sent without fragmentation.

According to one embodiment of the present invention, the changing comprises a binary search where the path MTU is initially bounded by a minimum size equal to the value eight plus the size of the first fragment, and a maximum size equal to the interface MTU minus the value eight.

Figure 4:
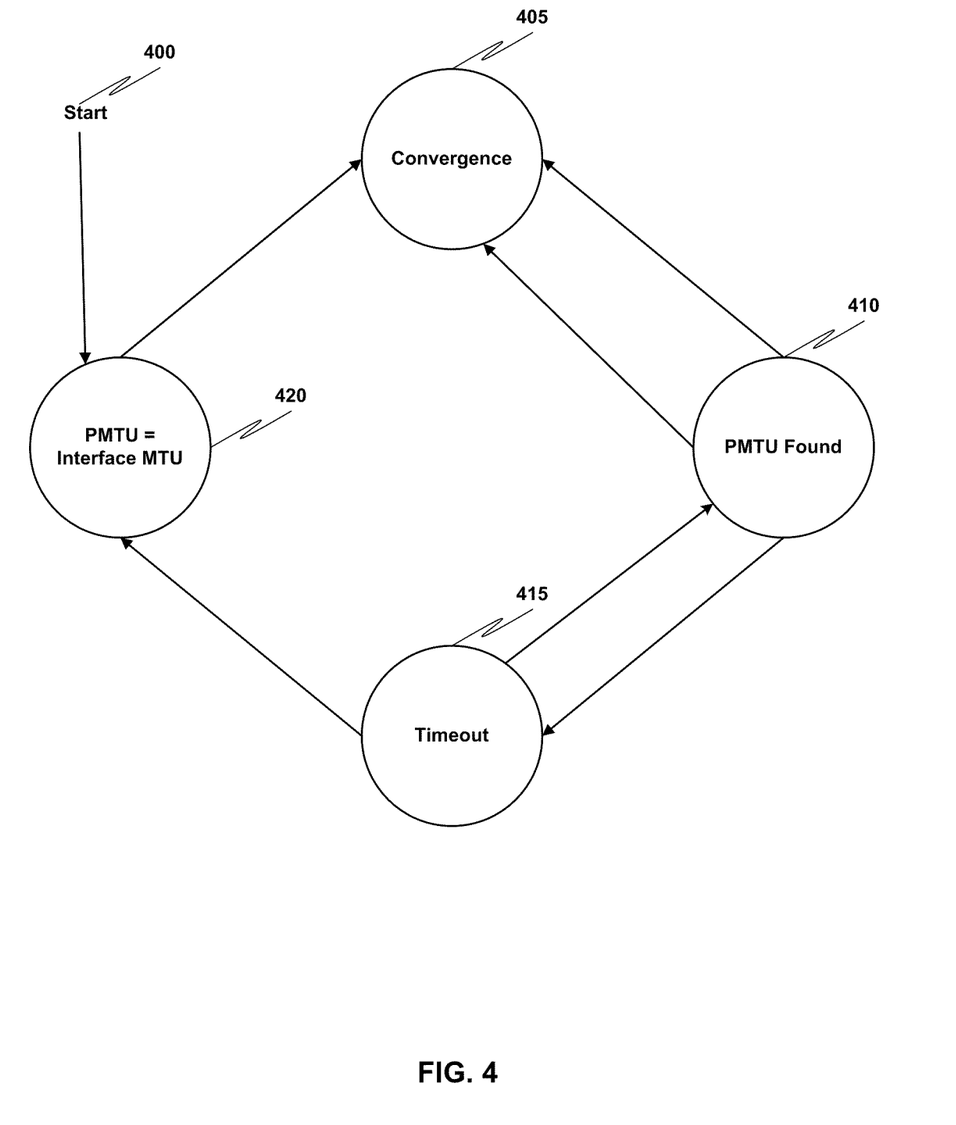
FIG. 4 is a state diagram that illustrates a method for tunnel path MTU discovery in accordance with one embodiment of the present invention.

FIG. 4 is a state diagram that illustrates a method for tunnel path MTU discovery in accordance with one embodiment of the present invention. At 420, the path MTU is initially set to the interface MTU. While in state 420, keep-alive packets having a size equal to the interface MTU and having a DF bit set to one are sent periodically until the sending fails. Success is indicated if an acknowledgement keep-alive packet is returned to the tunnel origination endpoint. Failure is indicated when the number of failed PMTU keep-alive packets exceeds a predetermined number of retries without the acknowledgement keep-alive packet being returned to the tunnel origination endpoint. When failure is indicated, the convergence state 405 is entered.

When in the convergence state 405, keep-alive messages of various MTU sizes are sent to converge upon the path MTU. A successful packet transmission indicates there was no packet fragmentation. An unsuccessful transmission indicates there was packet fragmentation. The process increases the size of the packets while the previous keep-alive packet succeeded, and decreases the size of the packets while the previous keep-alive packet failed, to converge upon the largest keep-alive packet that can be sent successfully (without fragmentation).

According to one embodiment of the present invention, a binary search is performed for the determining the path MTU.

According to another embodiment of the present invention, the binary search is initially bounded by (1) a minimum size comprising the value 8 plus a re-assembly size of a first packet fragment returned to the first network device in response to the first network device sending a second keep-alive packet having a relatively large size and indicating the second packet may be fragmented, and (2) a maximum size comprising the interface MTU minus the value eight. When the path MTU is determined, the "PTMU found" state 410 is entered.

When in the "PMTU found" state 410, keep-alive messages having a size equal to the determined PMTU and having the DF bit set are sent at a predetermined interval. A change in the path MTU is indicated when the number of failed PMTU messages exceeds the predetermined number of retries. If a change in the PMTU is indicated, convergence state 405 is entered. But if a timer elapses before a change in the path MTU is determined, the timeout state 415 is entered.

When the timeout state 415, PMTU messages having a size equal to the determined PMTU plus a predetermined number and having the DF bit set are sent. According to one embodiment of the present invention, the predetermined number is eight. If the number of failed PTMU messages exceeds the predetermined number of retries, the "PTMU Found" state 410 is entered. If PTMU message succeeds, an increase in the PTMU is concluded and the "PMTU=Interface MTU" state 420 is entered so that the new increased PTMU may be determined.

Figure 5:
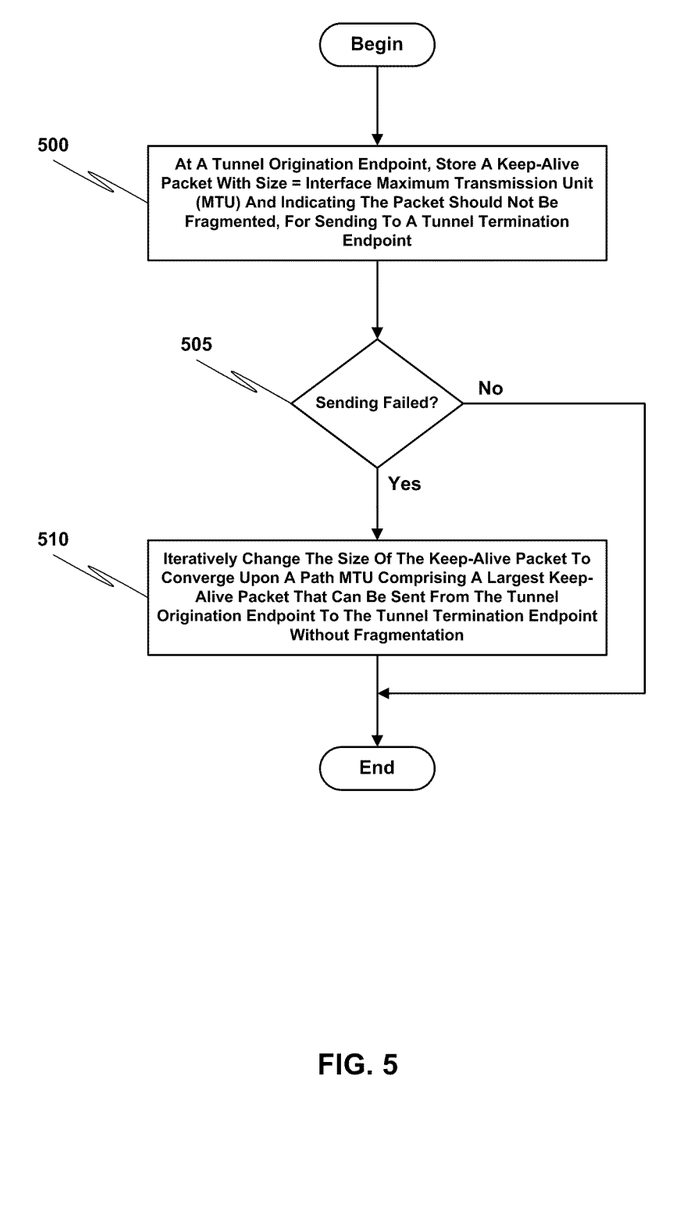
FIG. 5 is a flow diagram that illustrates a method for tunnel path MTU discovery from the perspective of a tunnel origination endpoint in accordance with one embodiment of the present invention.

FIG. 5 is a flow diagram that illustrates a method for tunnel path MTU discovery from the perspective of a tunnel origination endpoint in accordance with one embodiment of the present invention. At 500, at a tunnel origination endpoint, a keep-alive packet with a size equal to an interface MTU is stored for sending to a tunnel termination endpoint. The packet includes an indication that the packet should not be fragmented. At 505 a determination is made regarding whether the sending failed. If the sending failed, at 510 the size of the keep-alive packet is iteratively changed to converge upon a path MTU comprising a largest keep-alive packet that can be sent from the tunnel origination endpoint to the tunnel termination endpoint without fragmentation. The determining of the size for a next keep-alive packet is based at least in part on whether the current keep-alive packet failed. If the current keep-alive packet failed, the size of the next keep-alive packet is reduced. If the current keep-alive packet succeeded, the size of the next keep-alive packet is increased. This process continues until convergence on a path MTU is achieved.

According to one embodiment of the present invention, the changing comprises a binary search where the path MTU is initially bounded by a minimum size equal to the value eight plus the size of the first fragment, and a maximum size equal to the interface MTU minus the value eight.

Figure 6:
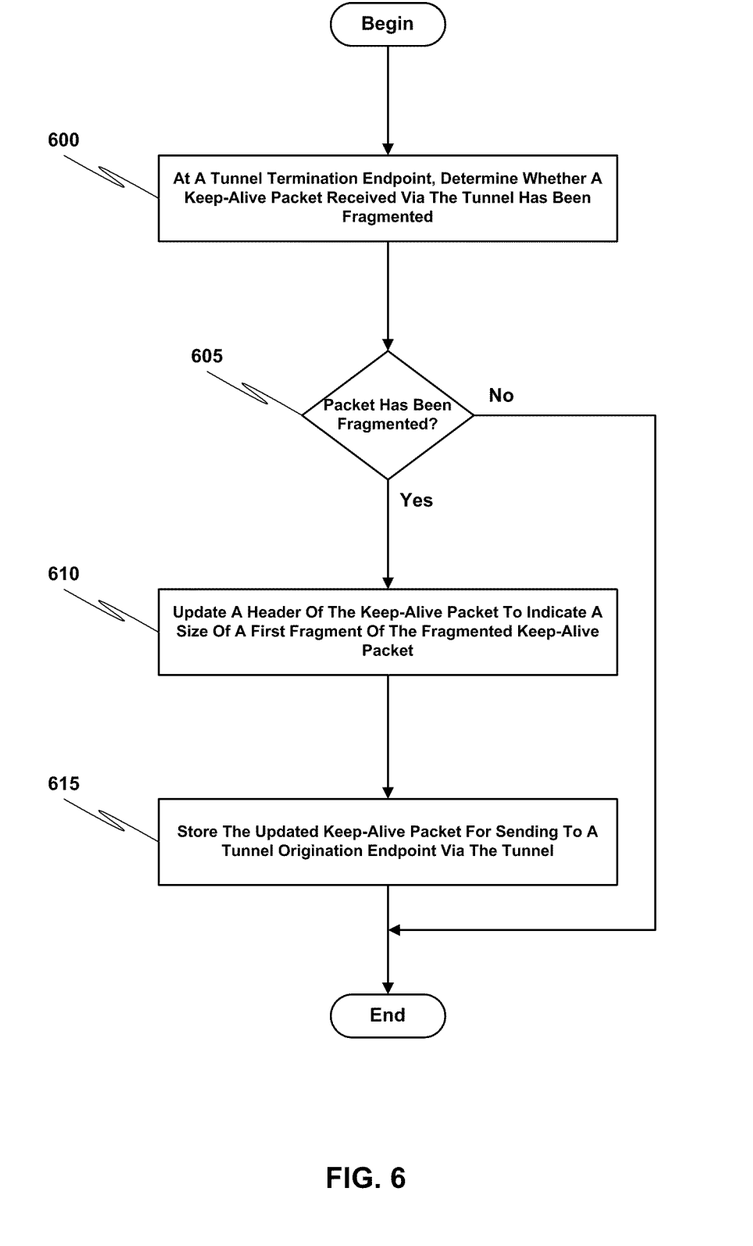
FIG. 6 is a flow diagram that illustrates a method for tunnel path MTU discovery from the perspective of a tunnel termination endpoint in accordance with one embodiment of the present invention.

FIG. 6 is a flow diagram that illustrates a method for tunnel path MTU discovery from the perspective of a tunnel termination endpoint in accordance with one embodiment of the present invention. The processes illustrated in FIG. 6 may be implemented in hardware, software, firmware, or a combination thereof. At 600, at a tunnel termination endpoint, a determination is made regarding whether a keep-alive packet received via the tunnel has been fragmented. If the packet has been fragmented, at 610 a header of the keep-alive packet is updated to indicate a size of a first fragment of the fragmented keep-alive packet. At 615, the updated keep-alive packet is stored for sending to a tunnel origination endpoint via the tunnel.

Figure 7:
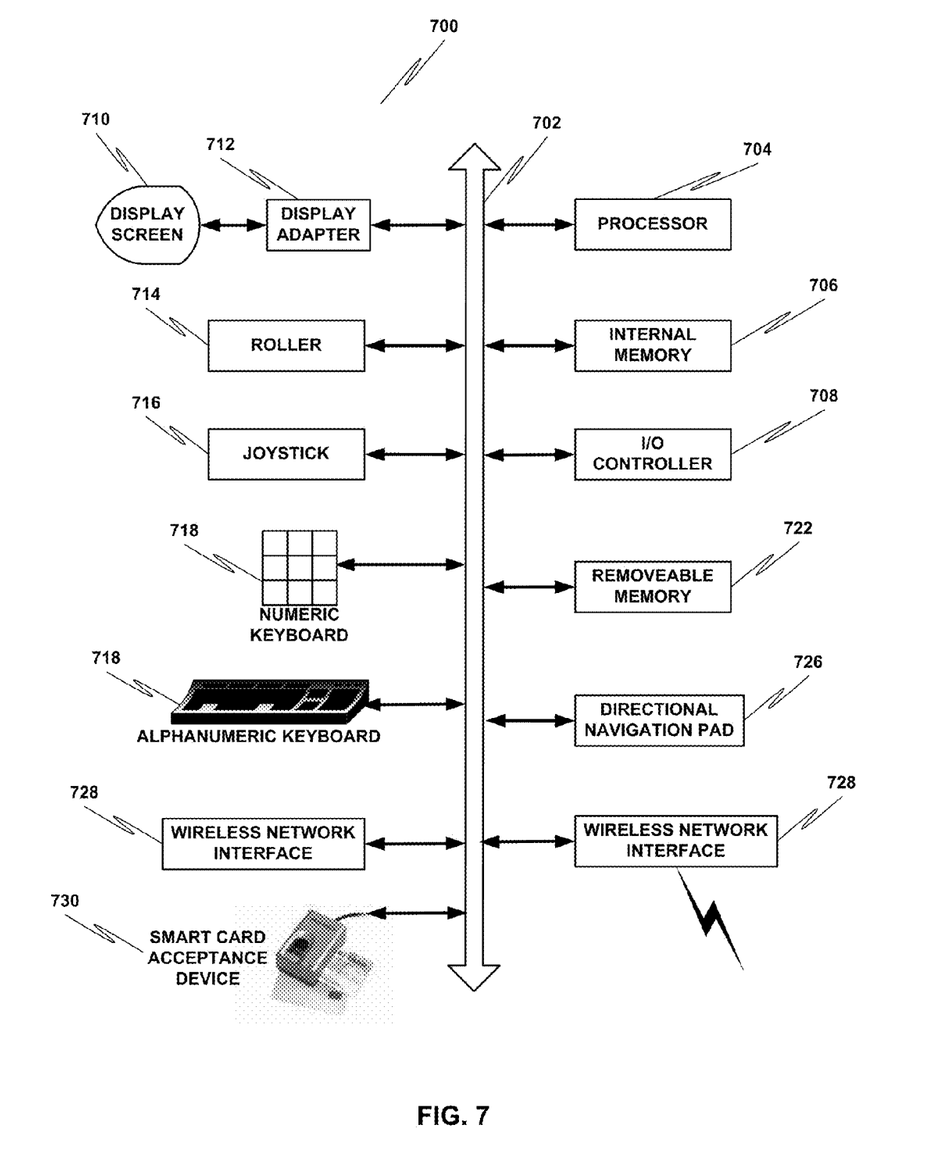
FIG. 7 is a block diagram of a computer system suitable for implementing aspects of the present invention.

FIG. 7 depicts a block diagram of a computer system 700 suitable for implementing aspects of the present invention. As shown in FIG. 7, system 700 includes a bus 702 which interconnects major subsystems such as a processor 704, an internal memory 706 (such as a RAM), an input/output (I/O) controller 708, a removable memory (such as a memory card) 722, an external device such as a display screen 710 via display adapter 712, a roller-type input device 714, a joystick 716, a numeric keyboard 718, an alphanumeric keyboard 718, directional navigation pad 726, smart card acceptance device 730, and a wireless interface 720. Many other devices can be connected. Wireless network interface 720, wired network interface 728, or both, may be used to interface to a local or wide area network (such as the Internet) using any network interface system known to those skilled in the art.

Many other devices or subsystems (not shown) may be connected in a similar manner. Also, it is not necessary for all of the devices shown in FIG. 7 to be present to practice the present invention. Furthermore, the devices and subsystems may be interconnected in different ways from that shown in FIG. 7. Code to implement the present invention may be operably disposed in internal memory 706 or stored on storage media such as removable memory 722, a floppy disk, a thumb drive, a CompactFlash® storage device, a DVD-R ("Digital Versatile Disc" or "Digital Video Disc" recordable), a DVD-ROM ("Digital Versatile Disc" or "Digital Video Disc" read-only memory), a CD-R (Compact Disc-Recordable), or a CD-ROM (Compact Disc read-only memory).

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method comprising:
   at a network device configured as an origination endpoint for a tunnel, storing a keep-alive packet having a size of an interface maximum transmission unit (MTU) for sending to a termination endpoint for the tunnel, the keep-alive packet indicating the packet should not be fragmented;
   if an acknowledgement keep-alive packet responsive to the sending is not received within a predetermined time, repeating the sending until the acknowledgement keep-alive packet is received or until a predetermined number of keep-alive packets have been sent without receiving the acknowledgement keep-alive packet; and
   if the acknowledgement keep-alive packet is not received, iteratively changing the size of the keep-alive packet to converge upon a path MTU, the path MTU comprising the size of a largest keep-alive packet that can be sent from the network device to the termination endpoint without fragmentation.

2. The method of claim 1 wherein the changing comprises performing a binary search for the path MTU.

3. The method of claim 2 wherein the binary search is initially bounded by:
   a minimum size comprising the value 8 plus a re-assembly size of a first packet fragment returned to the first network device in response to the first network device sending a second keep-alive packet having a size less than the interface MTU and indicating the second packet may be fragmented; and
   a maximum size comprising the interface MTU minus the value 8.

4. The method of claim 1, further comprising:
after the path MTU is determined, sending a keep-alive packet having a size of the path MTU at a predetermined interval.

5. The method of claim 4, further comprising:
if the sending of the keep-alive packet having a size of the path MTU fails, repeating the changing.

6. The method of claim 4, further comprising:
after a predetermined interval, sending a keep-alive packet having a size of the path MTU plus a predetermined amount; and
if the sending of the keep-alive packet having a size of the path MTU plus a predetermined amount succeeds, repeating the storing.

7. The method of claim 6 wherein the predetermined amount is eight bytes.

8. The method of claim 6 wherein the predetermined interval is based at least in part on an interval of a second keep-alive packet used to determine whether the tunnel is operational.

9. The method of claim 1 wherein
the first network device comprises a router; and
the termination endpoint comprises a router.

10. The method of claim 1 wherein the tunnel comprises a Generic Routing Encapsulation (GRE) tunnel.

11. A network device comprising:
a memory; and
one or more processors configured to:
store a keep-alive packet having a size of an interface maximum transmission unit (MTU) for sending to a termination endpoint for the tunnel, the network device configured as an origination endpoint for the tunnel, the keep-alive packet indicating the packet should not be fragmented;
if an acknowledgement keep-alive packet responsive to the sending is not received within a predetermined time, repeat the sending until the acknowledgement keep-alive packet is received or until a predetermined number of keep-alive packets have been sent without receiving the acknowledgement keep-alive packet; and
if the acknowledgement keep-alive packet is not received, iteratively change the size of the keep-alive packet to converge upon a path MTU, the path MTU comprising the size of a largest keep-alive packet that can be sent from the network device to the termination endpoint without fragmentation.

12. The network device of claim 11 wherein the changing comprises performing a binary search for the path MTU.

13. The network device of claim 12 wherein the binary search is initially bounded by:
a minimum size comprising the value 8 plus a re-assembly size of a first packet fragment returned to the first network device in response to the first network device sending a second keep-alive packet having a size less than the interface MTU and indicating the second packet may be fragmented; and
a maximum size comprising the interface MTU minus the value 8.

14. The network device of claim 11 wherein the one or more processors are further configured to:
after the path MTU is determined, send a keep-alive packet having a size of the path MTU at a predetermined interval.

15. The network device of claim 14 wherein the one or more processors are further configured to:
if the sending of the keep-alive packet having a size of the path MTU fails, repeat the changing.

16. The network device of claim 14 wherein the one or more processors are further configured to:
after a predetermined interval, send a keep-alive packet having a size of the path MTU plus a predetermined amount; and
if the sending of the keep-alive packet having a size of the path MTU plus a predetermined amount succeeds, repeat the storing.

17. The network device of claim 16 wherein the predetermined amount is eight bytes.

18. The network device of claim 16 wherein the predetermined interval is based at least in part on an interval of a second keep-alive packet used to determine whether the tunnel is operational.

19. The network device of claim 11 wherein
the network device comprises a router; and
the termination endpoint comprises a router.

20. The network device of claim 11 wherein the tunnel comprises a Generic Routing Encapsulation (GRE) tunnel.

21. A program storage device readable by a machine, embodying a program of instructions executable by the machine to perform a method, the method comprising:
at a network device configured as an origination endpoint for a tunnel, storing a keep-alive packet having a size of an interface maximum transmission unit (MTU) for sending to a termination endpoint for the tunnel, the keep-alive packet indicating the packet should not be fragmented;
if an acknowledgement keep-alive packet responsive to the sending is not received within a predetermined time, repeating the sending until the acknowledgement keep-alive packet is received or until a predetermined number of keep-alive packets have been sent without receiving the acknowledgement keep-alive packet; and
if the acknowledgement keep-alive packet is not received, iteratively changing the size of the keep-alive packet to converge upon a path MTU, the path MTU comprising the size of a largest keep-alive packet that can be sent from the network device to the termination endpoint without fragmentation.

22. A network device comprising:
means for, at a network device configured as an origination endpoint for a tunnel, storing a keep-alive packet having a size of an interface maximum transmission unit (MTU) for sending to a termination endpoint for the tunnel, the keep-alive packet indicating the packet should not be fragmented;
means for, if an acknowledgement keep-alive packet responsive to the sending is not received within a predetermined time, repeating the sending until the acknowledgement keep-alive packet is received or until a predetermined number of keep-alive packets have been sent without receiving the acknowledgement keep-alive packet; and
means for, if the acknowledgement keep-alive packet is not received, iteratively changing the size of the keep-alive packet to converge upon a path MTU, the path MTU comprising the size of a largest keep-alive packet that can be sent from the network device to the termination endpoint without fragmentation.

23. A method comprising:
at a network device configured as a termination endpoint for a tunnel, determining whether a keep-alive packet received via the tunnel has been fragmented;
if the keep-alive packet has been fragmented, updating a header of the keep-alive packet to indicate a size of a first fragment of the fragmented keep-alive packet; and
storing the updated keep-alive packet for sending, via the tunnel, to an origination endpoint for the tunnel, the fragment size for use in determining, by the origination endpoint, a path maximum transmission unit (MTU), the path MTU comprising the size of a largest keep-alive packet that can be sent from the origination endpoint to the network device without fragmentation.

24. The method of claim 23 wherein the determining a path MTU comprises performing a binary search initially bounded by:
a minimum size comprising the value 8 plus the fragment size; and
a maximum size comprising an interface MTU minus the value 8.

25. The method of claim 23 wherein
the network device comprises a router; and
the origination endpoint comprises a router.

26. The method of claim 23 wherein the tunnel comprises a Generic Routing Encapsulation (GRE) tunnel.

27. A network device comprising:
a memory; and
one or more processors configured to:
determine whether a keep-alive packet received via a tunnel has been fragmented, the network device configured as a termination endpoint for the tunnel;
if the keep-alive packet has been fragmented, update a header of the keep-alive packet to indicate a size of a first fragment of the fragmented keep-alive packet; and
store the updated keep-alive packet for sending, via the tunnel, to an origination endpoint for the tunnel, the fragment size for use in determining, by the origination endpoint, a path maximum transmission unit (MTU), the path MTU comprising the size of a largest keep-alive packet that can be sent from the origination endpoint to the network device without fragmentation.

28. The network device of claim 27 wherein the one or more processors are further configured to determine the path MTU by performing a binary search initially bounded by:
a minimum size comprising the value 8 plus the fragment size; and
a maximum size comprising an interface MTU minus the value 8.

29. The network device of claim 27 wherein
the network device comprises a router; and
the origination endpoint comprises a router.

30. The network device of claim 27 wherein the tunnel comprises a Generic Routing Encapsulation (GRE) tunnel.

31. A program storage device readable by a machine, embodying a program of instructions executable by the machine to perform a method, the method comprising:
at a network device configured as a termination endpoint for a tunnel, determining whether a keep-alive packet received via the tunnel has been fragmented;
if the keep-alive packet has been fragmented, updating a header of the keep-alive packet to indicate a size of a first fragment of the fragmented keep-alive packet; and
storing the updated keep-alive packet for sending, via the tunnel, to an origination endpoint for the tunnel, the fragment size for use in determining, by the origination endpoint, a path maximum transmission unit (MTU), the path MTU comprising the size of a largest keep-alive packet that can be sent from the origination endpoint to the network device without fragmentation.

32. A network device comprising:
means for, at a network device configured as a termination endpoint for a tunnel, determining whether a keep-alive packet received via the tunnel has been fragmented;
means for, if the keep-alive packet has been fragmented, updating a header of the keep-alive packet to indicate a size of a first fragment of the fragmented keep-alive packet; and
means for storing the updated keep-alive packet for sending, via the tunnel, to an origination endpoint for the tunnel, the fragment size for use in determining, by the origination endpoint, a path maximum transmission unit (MTU), the path MTU comprising the size of a largest keep-alive packet that can be sent from the origination endpoint to the network device without fragmentation.

* * * * *